United States Patent [19]
Schützner et al.

[11] Patent Number: 5,082,309
[45] Date of Patent: Jan. 21, 1992

[54] SUSPENSION SYSTEM FOR VEHICLES

[75] Inventors: Paul Schützner, Esslingen; Martin Fritz, Rudersberg, both of Fed. Rep. of Germany

[73] Assignee: Daimler-Benz AG, Fed. Rep. of Germany

[21] Appl. No.: 433,593

[22] Filed: Nov. 8, 1989

[30] Foreign Application Priority Data

Nov. 8, 1988 [DE] Fed. Rep. of Germany ....... 3837863

[51] Int. Cl.$^5$ .................................................. B60G 11/26
[52] U.S. Cl. ...................................... 280/714; 280/707
[58] Field of Search ................................ 280/714, 707

[56] References Cited

U.S. PATENT DOCUMENTS

| 4,655,440 | 4/1987 | Eckert | 280/714 |
| 4,850,461 | 7/1989 | Rubel | 280/714 |
| 4,887,699 | 12/1989 | Ivers et al. | 280/714 |
| 4,936,423 | 6/1990 | Karnopp | 280/714 |

FOREIGN PATENT DOCUMENTS

| 1405781 | 6/1970 | Fed. Rep. of Germany . |
| 3225604 | 1/1983 | Fed. Rep. of Germany . |
| 3408292 | 8/1985 | Fed. Rep. of Germany . |
| 3610937 | 10/1987 | Fed. Rep. of Germany . |

Primary Examiner—Kenneth R. Rice
Attorney, Agent, or Firm—Evenson, Wands, Edwards, Lenahan & McKeown

[57] ABSTRACT

An adjustment for vehicle shock absorbers provides for a variable difference between a damping coefficient for the tension stroke and the damping coefficient for the compression stroke. In response to constant short-stroke oscillations of the wheels caused by unevenness of the road, a particular shock absorber generates a force on the vehicle body, the amount of which depends on the difference. By an appropriate control of the forces from the shock absorbers, pitching and rolling movements of the body can be counteracted.

10 Claims, 4 Drawing Sheets

SUSPENSION SYSTEM FOR VEHICLES

BACKGROUND AND SUMMARY OF THE INVENTION

The invention relates to a suspension system for motor vehicles with supporting forces for influencing the vehicle position, which forces are variable independently of one another from wheel to wheel.

Active suspension systems are known in which the vehicle body is carried by supporting units, the supporting forces of which can be changed rapidly by means of a control device in order to keep the vehicle body in a particular desired position or urge it into such a position. Systems of this type are characterized by a high flexibility.

For example, according to German Offenlegungsschrift 3,408,292, it is possible to guarantee a driving behavior of great comfort as well as to counteract rolling or pitching movements of the vehicle body occurring under certain circumstances in a sustained way despite a sometimes very soft setting of the suspension.

However, the main disadvantage of such a system has been that considerable power is required for supporting the vehicle body. Furthermore, a high outlay in regulating terms is also necessary. The power requirement of these systems can be reduced by arranging passive spring elements which exert essentially the static supporting forces in parallel to the supporting units, so that the supporting units serve for compensating dynamic forces during motoring. Nevertheless, the outlay in regulating terms cannot be reduced in this way, but on the contrary, the forces of passive spring elements which vary according to the stroke position of the wheels additionally have to be taken into account.

Furthermore, vehicles with controllable shock absorbers are known for proving (especially where vehicles with a very high maximum speed are concerned) the best possible comfort during slow motoring by a soft setting of the shock absorbers and a high driving safety at high speeds by a harder shock-absorber setting. The suspension elements of these suspension systems are usually designed as predominantly passive elements, for example in the form of helical springs or pneumatic elements. Accordingly, virtually no power is required for supporting the vehicle body.

German Offenlegungsschrift 3,610,937 shows controllable shock absorbers in which the damping resistances for the tension stage and the compression stage can be controlled independently of one another by actuating controllable throttles assigned to the tension and compression stages. The corresponding power requirement there is extremely low.

The object of the instant invention is to provide a suspension system in which, even with a soft setting, or one in which the emphasis is on comfort, undesirable rolling and pitching movements of the vehicle body will be reliably prevented and one which will be possible at a low outlay in regulating terms and without an appreciable power requirement.

According to the invention, this object is achieved as a result of the fact that the supporting forces are varied because the shock absorbers assigned to the vehicle wheels have different forces in the damping coefficients in the tension and compression stages or directions as well as from wheel to wheel.

The invention is based on the fact that, with shock absorbers which have damping coefficients differing in the tension and compression directions, resultant forces can be generated in a particular direction when the shock absorber is moved alternately in the tension and compression directions in quick succession. The following applies to the average force $\bar{F}$ on the shock absorber:

$$\bar{F} = \bar{v}_D \cdot D_D - \bar{v}_Z \cdot D_Z,$$

wherein:
$D_D$ = damping coefficient in the direction of compression
$D_Z$ = damping coefficient in the direction of tension
$\bar{v}_D$ = average relative speed of the shock-absorber elements (for example, the piston and cylinder) in the direction of compression
$\bar{v}_Z$ = average relative speed of the shock-absorber elements in the direction of tension.

By varying the damping coefficients for the direction of tension and compression, different forces acting on the vehicle body can be generated because the wheels of a vehicle execute, even on good roads, relatively short and high-frequency suspension strokes which are caused by roughnesses of the road surface. If, for example, differences of the damping coefficients are set on the front axle than set on the rear axle or if differences of the damping coefficients on one vehicle side deviate from the corresponding differences on the other vehicle side, torques acting on the vehicle body relative to the transverse axis or longitudinal axis of the vehicle can be generated. Thus by varying the differences of the damping coefficients, rolling and pitching movements of the vehicle body can be counteracted.

The invention therefore utilizes unavoidable high-frequency suspension strokes of the vehicle wheels to generate adjusting forces which keep the vehicle body in a desired position or urge it into this position.

A particular advantage of the invention is that the control of the shock absorbers can be carried out virtually without any power requirement. Furthermore, good emergency running properties in the event of a failure of the control device can be guaranteed in a simple way. For this, the control members of the shock absorbers merely have to be designed so that in the event of a malfunction of the control device, they automatically and positively bring the shock absorbers into a setting with high damping coefficients.

To ensure a low outlay in regulating terms, it is expedient if the control device determines a measure of the roll or pitch angles by defining the difference between the average values of the stroke positions of the front and rear wheels, or the difference between the average values of the stroke positions of the wheels on one vehicle side and the wheels on the other vehicle side. Position coordinates related to the vehicle body can thus be determined without an appreciably high outlay.

For the suspension system according to the invention, it is preferable to utilize double-acting hydraulic telescopic shock absorbers comprising a cylinder with a piston guided displaceably therein to subdivide the cylinder and having a piston rod located on one side and a line connecting one cylinder space located on the same side as the piston rod to the other cylinder space located on the other side of the piston. The connecting line should contain a non-return valve arrangement which only allows a flow from the other space into the first space. A hydraulic reservoir is connected to the one space via a controllable servo or proportional valve arrangement and to the other space via a further non-return valve arrangement which only allows a flow from the reservoir into the other space.

In this design of the telescopic shock absorber, a hydraulic flow passes through the servo or proportional valve arrangement in the direction of the reservoir during each stroke movement of the piston relative to the cylinder and independently of the stroke direction. In particular, during a stroke movement of the piston in the direction of compression, the total volume of the space located on the same side as of the piston rod and of the other space is reduced. Here the hydraulic pressure medium can be displaced out of these spaces through the servo or proportional valve arrangement only, because the connection between the other space and the reservoir is blocked by the associated non-return valve arrangement. When the piston is moved relative to the cylinder in the direction of tension, the volume of the space located on the same side of the piston rod is reduced, and the hydraulic medium displaced from this space can again escape only via the servo or proportional valve arrangement, because the connection between the space located on the same side as the piston rod and the other space of the cylinder is blocked by the associated non-return valve arrangement. If the piston cross-section is approximately twice as large as the cross-section of the piston rod, approximately equal quantities of a hydraulic medium will flow through the servo or proportional valve arrangement during the compression stroke and during the tension stroke.

Now if the servo or proportional valve arrangement is controlled differently during the compression stroke and the tension stroke, then during short high-frequency suspension strokes of the wheel assigned to the particular shock absorber, means forces acting on the vehicle body can be generated.

In a modified embodiment of the telescopic shock absorber, the servo or proportional valve arrangement has two parallel line branches with a two position change-over valve arrangement in which either line is closed and the other is opened.

In this embodiment, the servo or proportional valve arrangement can possess valves assigned separately to the line branches and controllable independently of one another.

Instead, it is also possible and advantageous for the servo or proportional valve arrangement to possess valves, coupled to one another in driving terms in such a way that the flow resistance of the valve or valves for one line increases when the flow resistance for the other line branch is reduced.

The advantage with the two line or proportional valve arrangement is that the flow resistances of the valves can be adjusted irrespective of whether the telescopic shock absorber has just been loaded with the effect of a tension stroke or with the effect of a compression stroke. The change-over valve ensures actuation of the valve/s which are set to the damping coefficient for the compression stroke in a particular line during the compression stroke, and during the tension stroke the valves of the other line are set to the damping coefficient for the tension stroke.

Other objects, advantages and novel features of the present invention will become apparent from the following detailed description of the invention when considered in conjunction with the accompanying drawings.

DETAILED DESCRIPTION OF THE DRAWINGS

Figure 1:
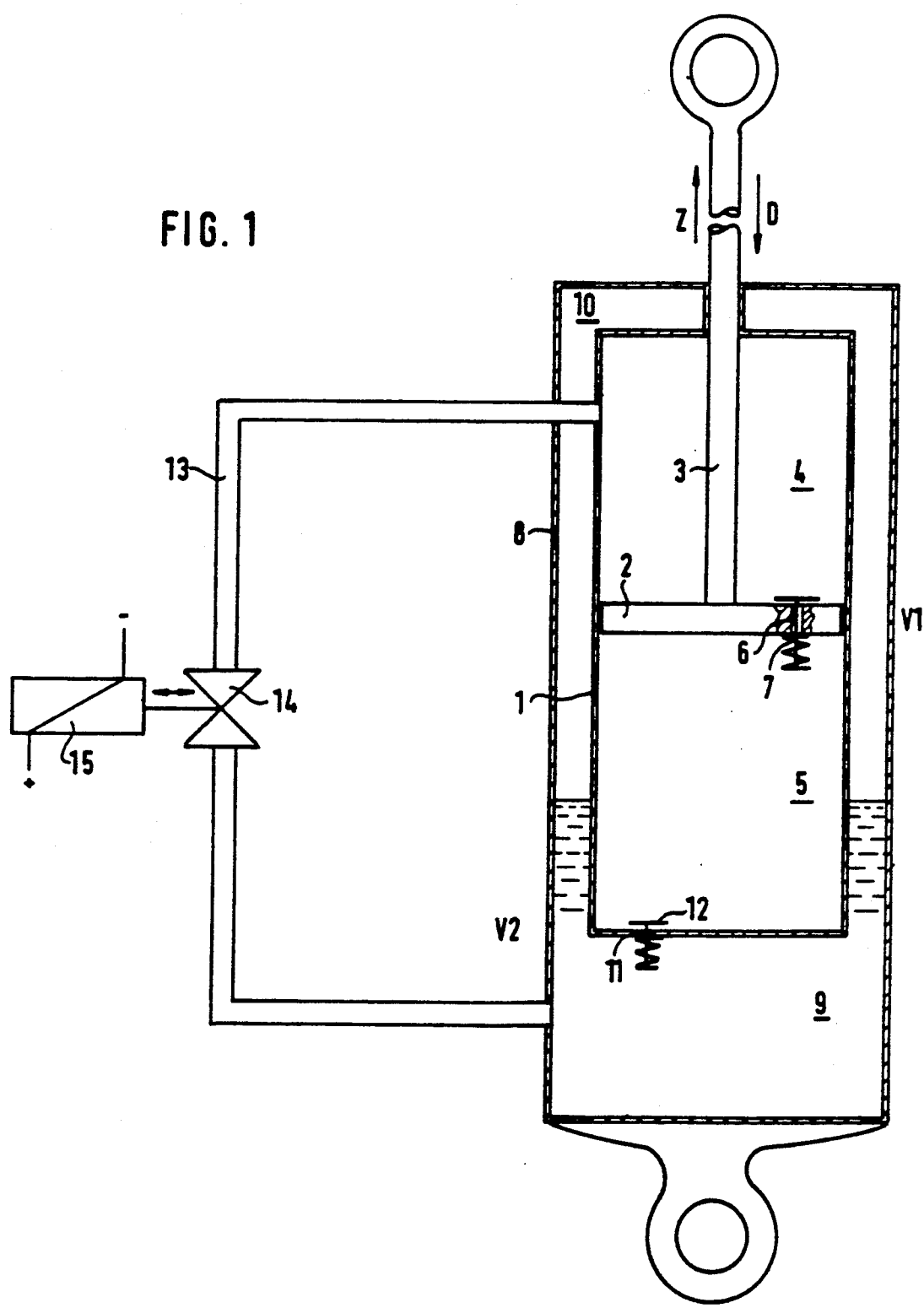
FIG. 1 shows a first embodiment of a hydraulic telescopic shock absorber, in which the difference between the damping coefficients for the compression stroke and the tension stroke is adjustable or variable.

In the hydraulic telescopic shock absorber illustrated in FIG. 1, a piston 2 is guided so as to be slideably displaceable in a first cylinder 1 and has a piston rod 3 which is arranged on one side and which passes through a top of the cylinder 1. The piston 2 separates the cylinder 1 into a space 4 located on the same side as the piston rod and a space 5 on a side of the piston 2 facing away from the piston rod 3. The spaces 4 and 5 in the cylinder 1 are connected to one another via line 6 which passes through the piston 2 and which is controlled by a non-return valve 7, in such a way that only a flow from the space 5 into the space 4 is possible. The spaces 4 and 5 are filled with hydraulic medium, usually hydraulic oil.

The cylinder 1 is surrounded by a further cylinder 8 which is firmly connected to it. The lower region of cylinder 8 forms a reservoir 9 for hydraulic medium or hydraulic oil and the upper region 10 receives a pressurized pneumatic medium from a source (not shown). If appropriate, the reservoir 9 and the upper region 10 can be separated from one another by means of a diaphragm (not shown).

The space 5 of the cylinder 1 is connected to the reservoir 9 via a line 11 which passes through the bottom of the cylinder 1 and in which a non-return valve 12 is arranged in such a way that only a flow from the reservoir 9 into the space 5 is possible.

The space 4 of the cylinder 1, located on the same side as the piston rod, is connected to the reservoir 9 via a line 13 which is controlled by a servo or proportional valve arrangement 14. The valve arrangement 14 has an actuator 15, (for example an electric servo-motor) and provides a throttle resistance for quickly changing the flow of the hydraulic medium in the line 13 and within a wide range. The servo-motor 15 works with a very short response time (for example, 20 ms or below).

Hydraulic medium flows through the line 13 in the direction of the reservoir 9 both during the compression stroke (movement of the piston 2 in the direction of the arrow D) and during the tension stroke (movement of the piston 2 in the direction of the arrow Z). In particular, during the compression stroke the total sum volume of the spaces 4 and 5 of the cylinder 1 decreases because the piston rod 3 enters the cylinder 1 to a greater extent. Since the non-return valve 12 prevents a flow directly from the space 5 into the reservoir 9, the hydraulic medium displaced from the spaces 5 during the compression stroke can escape via valve 7 into space 4 and from there out the cylinder 1 via the line 13.

During the tension stroke, the non-return valve 7 prevents hydraulic medium displaced from the space 4 from passing directly into the space 5 of the cylinder 1 via the line 6. Instead, the hydraulic medium displaced from the space 4 is itself conveyed into the reservoir 9 via the line 13, and at the same time hydraulic medium can go from the reservoir 9 into the space 5 of the cylinder 1 via the non-return valve 12 which opens in this flow direction.

By an appropriately differing setting of the servo or proportional valve arrangement 14, it is possible to ensure that the telescopic shock absorber offer a resistance to the tension stroke other than that offered to the compression stroke. When the piston 2 is shifted to and fro in quick succession, for example as a result of rapid suspension strokes of the axle of a vehicle connected to the piston rod 3 and with the cylinders 1 and 8 held fast on the body of a vehicle, a resultant force, the amount of which can be calculated according to the above-mentioned formula I, is exerted in a particular direction on the cylinder 1 and the cylinder 8 or on the vehicle body connected thereto. Since the particular setting of the servo or proportional valve arrangement 14 determines the damping coefficients $D_Z$ and $D_D$, the resultant force $F$ is consequently determined by the setting of the servo or proportional valve arrangement 14 which differs for the compression stroke and tension stroke.

Figure 2:
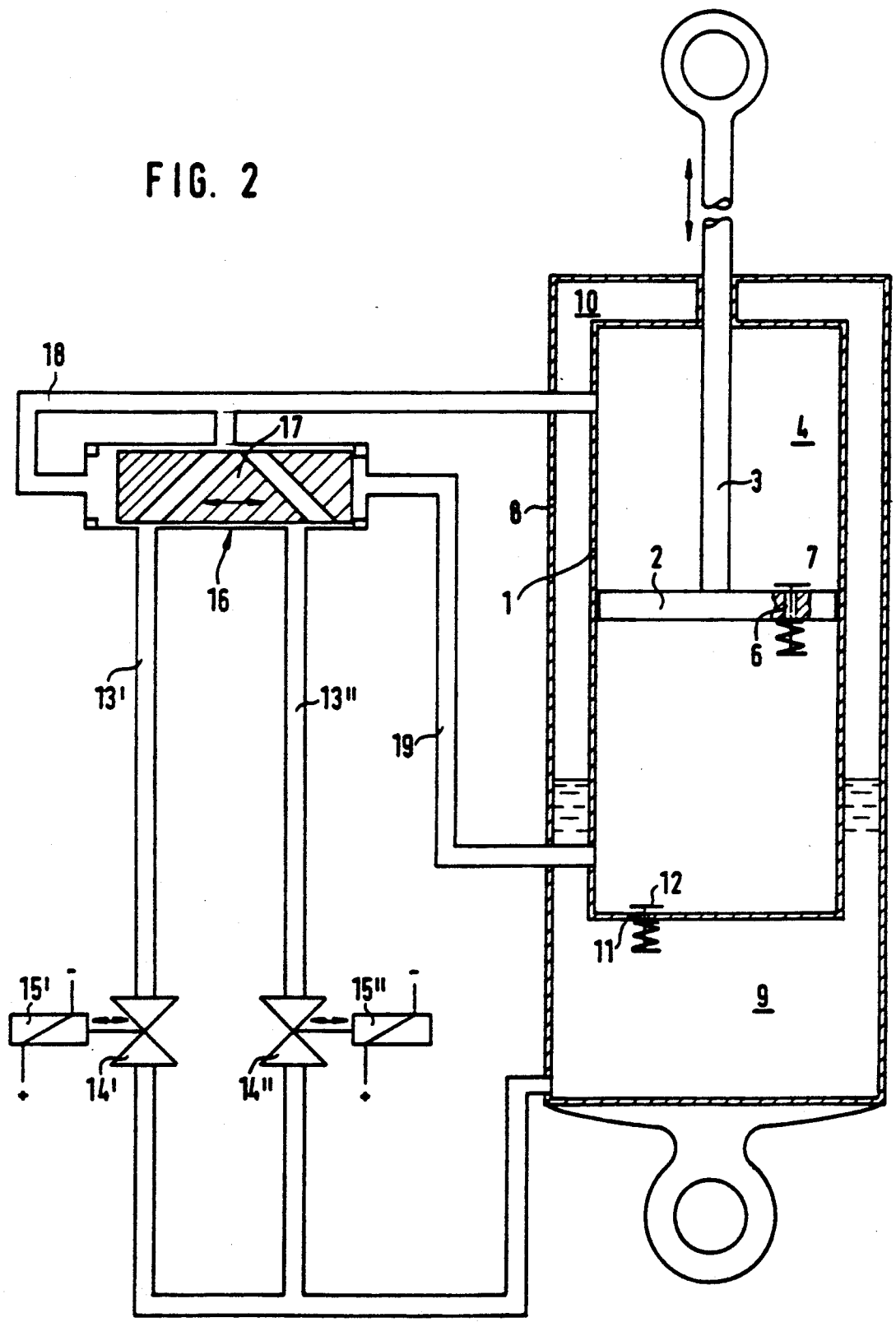
FIG. 2 shows a modified embodiment of a telescopic shock absorber of this type.

The embodiment of the telescopic shock absorber illustrated in FIG. 2 differs from the embodiment according to FIG. 1 in that the line 13 has two line branches 13' and 13" and the servo or proportional valve arrangement is formed by two separate servo or proportional valves 14' and 14", the valve 14' controlling the line branch 13' and the valve 14" controlling the line branch 13". Each of the valves 14' and 14" is actuated by its own servo-motor 15', 15" both of which work with very short response times (20 ms and below).

Only one of the line branches 13' and 13" is connected at any particular time to the space 4 of the cylinder 1 located on the same side as the piston rod.

This is ensured by means of a change-over valve 16.

The change-over valve 16 comprises a valve slide 17 which is displaceably arranged in the manner of a piston in a valve housing and which is urged into its left-hand end position by a spring (not shown). The valve slide 17 is subjected on one end face, via a line 18, to hydraulic medium in the space 4 of the cylinder 1 located on the same side as the piston rod. The other end face of the slide 17 is subjected via a line 19 to a hydraulic medium in the space 5 of the cylinder 1. During the compression stroke of the piston 2, the slide 17 is pushed by the above-mentioned spring into its left-hand end position (not shown), in which the line branch 13' is shut off by the change-over valve 16, while the line branch 13" is opened. During the tension stroke of the piston 2, a markedly higher pressure occurs in the space 4 and therefore in the line 18 than in the space 5 of the cylinder 1 and therefore in the line 19. Accordingly, during the tension stroke of the piston 2 the slide 17 is pushed into the right-hand end position shown, in which the line branch 13' is opened and the line branch 13" is closed.

The change-over valve 16 thus ensures that the line branch 13' is cut in or activated during the tension stroke and the line branch 13" during the compression stroke. By an appropriate setting of the servo or proportional valves 14' and 14", it is then possible, once again, to ensure that the resistance offered to a movement of the piston 2 during the compression stroke is other than that offered during the tension stroke.

At the same time, the respective resistances and their differences can be varied substantially as desired by means of the separately adjustable servo or proportional valves 14' and 14".

Figure 3:
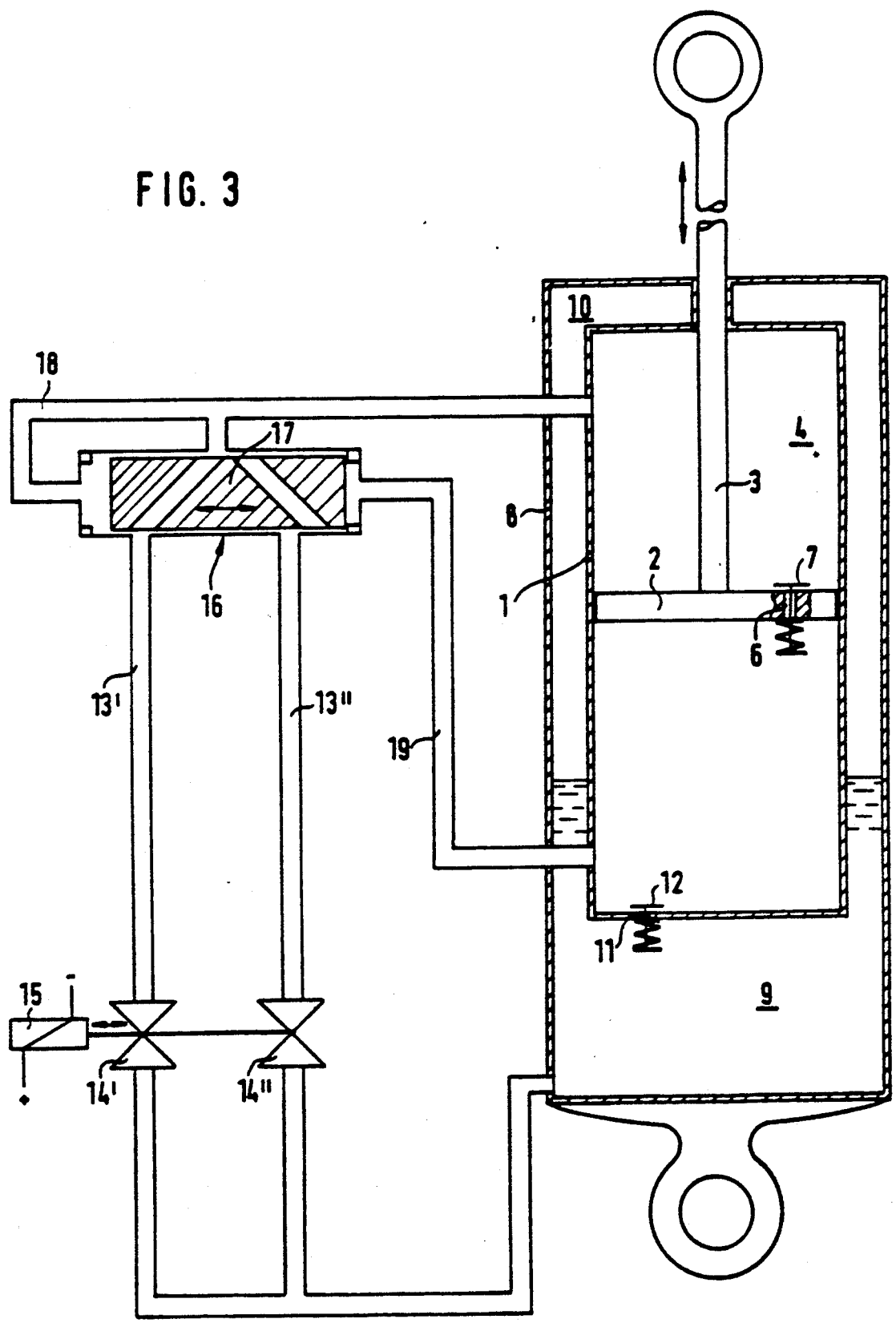
FIG. 3 shows a further modified embodiment of the telescopic shock absorber.

The embodiment illustrated in FIG. 3 differs from that according to FIG. 2 essentially only in that the servo or proportional valves 14' and 14" are coupled to one another in driving terms and can be driven by means of a single fast-response servo-motor 15. The drive coupling of the servo or proportional valves 14' and 14" is designed in such a way that, with an increase of the throttle resistance of one valve (for example 14'), the throttle resistance of the other valve (for example 14") is reduced. The valves 14' and 14" are therefore drive-coupled to one another in opposition.

Accordingly, therefore, once again the difference between the damping coefficients which are effective during the compression stroke and during the tension stroke o the piston 2 can be varied as desired.

The motor vehicle (shown diagrammatically in FIG. 4) has front wheels 21 and 22 and rear wheels 23 and 24. A helical spring element 25 is assigned to each of the wheels 21 to 24 or to the respective wheel suspension. These spring elements 25 support the vehicle body (not shown) on the respective wheels 21 to 24 or the associated ends of the front and rear axles.

A hydraulic telescopic shock absorber 26 is connected in parallel to each spring element 25. These shock absorbers 26 are designed according to FIGS. 1, 2 or 3 and, like the spring elements 25, are arranged between the vehicle body and the wheels 21 to 24 or their wheel suspensions.

Furthermore, each of the wheels 21 to 24 is assigned a stroke transmitter 27, the signals of which reproduce the respective stroke position of the associated wheel in relation to the vehicle body. The stroke transmitters 27 are connected to the input side of a control device 28 which, on the output side, is connected to the telescopic shock absorber 26 or to their servo-motors 15, 15' or 15" (see FIGS. 1 to 3). That is, the damping coefficients of the telescopic shock absorbers 26 are varied by the control device 28 as a function of the signals of the stroke transmitters 27.

Figure 4:
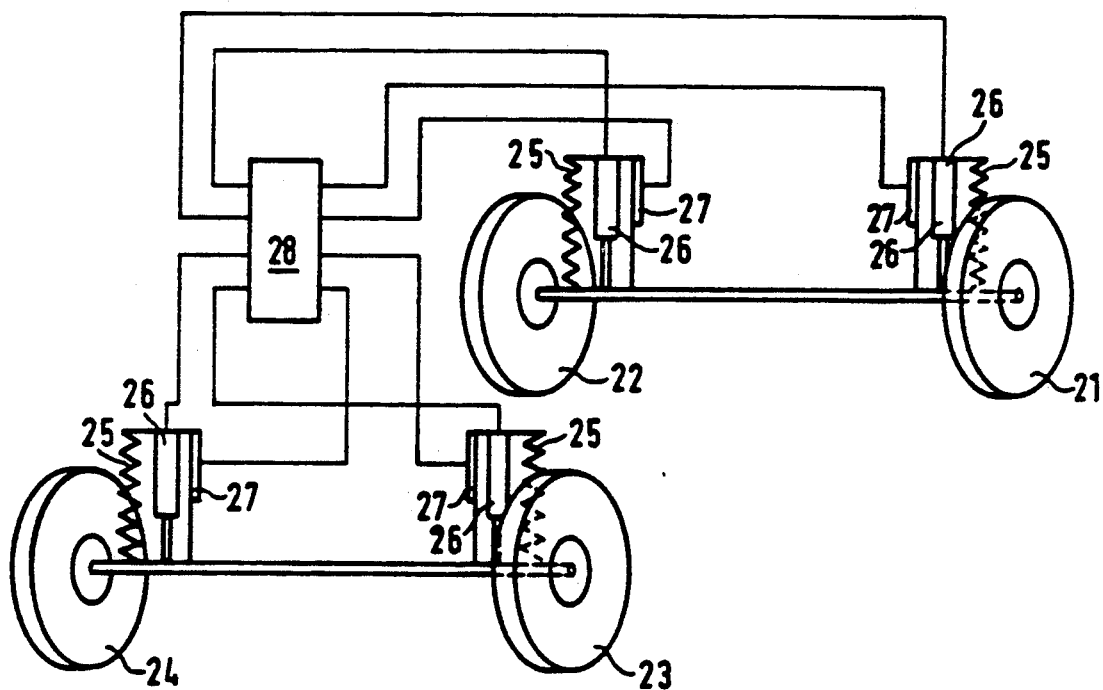
FIG. 4 shows a diagrammatic general view of the suspension system according to the invention.

The suspension system illustrated in FIG. 4 works as follows:

Because of unevenness and roughness of the road, the wheels 21 to 24 executed relatively high-frequency stroke movements in relation to the vehicle body. The frequency of these movements is typically in the range around 10 Hz. These movements of the wheels 21 to 24 are of very short stroke.

Furthermore, in response to more pronounced road unevenness and other disturbing influences (such as for example, cross-wind or the like) the vehicle body executes relatively large-stroke movements of a low frequency which is typically in the region of 1 Hz.

The control device 28 forms average time values from the signals of the stroke transmitters 27, in order to determine the nature of the usually long-stroke body movements of low frequency.

By determining the average time value of all the signals from the stroke transmitters, it is possible to observe to what extent the vehicle body executes stroke movements in an upward or downward direction in relation to the wheels 21 to 24 or to a plane containing the centers of the wheels 21 to 24. These stroke movements can then be counteracted by varying the damping coefficients of the telescopic shock absorbers 26. Thus, stroke movements of low frequency abate quicker with higher damping coefficients.

Moreover, additional forces which counteract the stroke movements can be generated by means of the telescopic shock absorbers 26. In particular, with the telescopic shock absorbers 26 according to the invention, the difference between the damping coefficients for the compression stroke and tension stroke can be varied. As a result of the constant high-frequency short-stroke oscillations of the wheels 21 to 24, there then acts between the wheels and the body an additional force, the amount of which depends on the size of the difference between the damping coefficients and the direction of which depends on whether the damping coefficient for the compression stroke is higher or lower than the damping coefficient for the tension stroke. Therefore, by an appropriate setting of the telescopic shock absorbers 26 it is possible to generate additional forces which counteract the particular stroke movements of the vehicle body.

Furthermore, the control device 28 constantly determines an average time value of the signals of the stroke transmitters 27 on the front wheels 21 and 22 and an average value of the signals of the stroke transmitters 27 on the rear wheels 23 and 24. The size of the difference between these two average values represents the particular pitch angle of the vehicle body in relation to a plane containing the centers of the wheels 21 and 24. In this way, the control device 28 can "ascertain" whether the vehicle body is executing pitching movements as well as the direction in which the particular pitching movement has just taken place.

Now it is possible to counteract the pitching movements to a greater extent by increasing the damping coefficients of the telescopic shock absorbers 26.

Additionally, or alternatively, the pitching movements can be counteracted if differences between the damping coefficients for the compression stroke and tension stroke are set on the telescopic shock absorbers 26 of the front wheels 21 and 22 than on the shock absorbers 26 of the rear wheels 23 and 24. Because of the constant high-frequency oscillations of the wheels 21 to 24, the differences set differently in this way mean that different additional forces are effective between the front wheels 21 and 22 and the vehicle body than on the rear wheels 23 and 24. This is equivalent to having the additional forces exert a torque on the vehicle body relative to the transverse axis of the vehicle. An appropriate setting of the telescopic shock absorbers 26 makes it possible to ensure that this torque counteracts the particular pitching movement of the vehicle.

Furthermore, the control device 28 determines average time values of the signals of the stroke transmitters 27 of the right wheels 21 and 23 and corresponding average values of the stroke transmitters 27 of the left wheels 22 and 24. The difference between these average values is a measure of the particular roll angle of the vehicle body in relation to a plane containing the wheel centers. Moreover, the control device 28, by constantly determining this difference, can recognize the direction in which rolling movements of the vehicle body occur.

These rolling movements can be counteracted in basically the same way as the pitching movements. There is the possibility of causing the rolling movements to abate quickly by increasing the damping coefficients of the telescopic shock absorbers 26. Additionally or alternatively, there is the possibility of setting another difference between the damping coefficients for the compression stroke and tension stroke of the telescopic shock absorbers 26 on the right wheels 21 and 23 than those on the left wheels 22 and 24. Because of the constant high-frequency oscillations of the wheels 21 to 24, additional forces exerting a torque on the vehicle body relative to the longitudinal axis of the vehicle can consequently be generated. By an appropriate control of the telescopic shock absorbers 26, it is then possible to ensure that this torque counteracts the particular rolling movements and thereby causes these to abate especially quickly.

In conclusion, therefore, it can be said that, with the system according to the invention, the value of the damping coefficients of the telescopic shock absorbers 26 is variable. For each telescopic shock absorber 26, the difference between the damping coefficients for the compression stroke and tension stroke of the particular shock absorber 26 can also be varied in order to utilize the high-frequency oscillatory movements of the respective wheel relative to the body for generating an additional force which acts on the body and which, with an appropriate control, counteracts undesirable body movements.

The above-described telescopic shock absorbers 26 are capable of working only in an approximately vertical position, and in general the piston rod 3 is connected to the body and the cylinders 1 and 8 to the axle shaft of the vehicle.

The servo-motors 15 and the valves 14, 14' and 14" are actuated by means of a control device which allows the actual position of the vehicle body relative to a reference plane (a predetermined desired position) to be determined. For example, the position of the vehicle body can be ascertained by determining the acceleration on the vehicle body and then performing a double integration of the measured values of the acceleration in order to determine position coordinates. Additionally or alternatively, the distances between the body and the wheels can be defined by means of appropriate sensors, in order to ascertain the position or the pitch and roll angles of the body relative to a reference plane (for example, the plane containing the centers or contact points of the wheels). In principle, however, the position finding can also be carried out in another way.

The invention is especially advantageous on buses and, where appropriate, also on heavy-goods vehicles.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Suspension system for vehicles having individual shock absorbers between each vehicle wheel and a vehicle body and with supporting forces for influencing the vehicle body position which are independently variable from wheel to wheel, comprising means for varying the supporting forces at each shock absorber of the vehicle wheels by controlling a difference between damping coefficients in a tension and a compression operation,
   wherein the individual shock absorbers are double-acting hydraulic telescopic shock absorbers comprising:
   a cylinder;
   a piston guided displaceably in the cylinder and dividing the cylinder into first and second cylinder spaces at respective opposite sides of the piston;

the piston having a piston rod located on one side thereof and extending through the first cylinder space; and line means connecting the first cylinder space to the second cylinder space;

a first non-return valve arrangement which only allows flow from the second cylinder space into the first cylinder space; and a hydraulic reservoir connected to said first cylinder space via a controllable valve means and to the second cylinder space via a further non-return valve means which allows only for flow from the reservoir into the second cylinder space, wherein the line means comprises two parallel line branches with a two position change-over valve means which connects either one line branch or the other between the reservoir and the first cylinder space, wherein the change-over valve means comprises a piston-like control slide which is stressed towards one end position by the pressure in said first cylinder space and towards its other position by the pressure in the second cylinder space.

2. Suspension system according to claim 1, wherein the controllable valve means comprises at least two valves in the line means, each controllable independently of one another.

3. Suspension system according to claim 2, wherein the controllable valve means comprises at least two valves that are coupled to one another in driving terms, in such a way that the flow resistance of one of the two valves increases when the flow resistance of another of the two valves is reduced.

4. Suspension system according to claim 1, wherein the controllable valve means comprises at least two valves that are coupled to one another in driving terms, in such a way that the flow resistance of one of the two valves increases when the flow resistance of another of the two valves is reduced.

5. Suspension system according to claim 1, wherein the varying means includes control means for sensing pitch and roll angles of the vehicle body by vertical positions of the front and rear wheels and the difference between the average values of vertical positions of wheels on one vehicle side and wheels on another vehicle side.

6. Suspension system according to claim 5, wherein the controllable valve means comprises at least two valves in the line means, each controllable independently of one another.

7. Suspension system for vehicles having individual shock absorbers between each vehicle wheel and a vehicle body and with supporting forces for influencing the vehicle body position which are independently variable from wheel to wheel, comprising vending means for varying the supporting forces at each shock absorber of the vehicle wheels by controlling a difference between damping coefficients in a tension and a compression operation, wherein the individual shock absorbers are double-acting hydraulic telescopic shock absorbers comprising:

a cylinder;

a piston guided displaceably in the cylinder and dividing the cylinder into first and second cylinder spaces at respective opposite sides of the piston;

the piston having a piston rod located on one side thereof and extending through the first cylinder space; and line means connecting the first cylinder space to the second cylinder space;

a first non-return valve arrangement which only allows flow from the other space into the first cylinder space;

a hydraulic reservoir connected to said first cylinder space via a controllable valve means and to the second cylinder space via a further non-return valve means which allows only for flow from the reservoir into the second cylinder space, wherein the line means comprises two parallel line branches with a two position change-over valve means which connects either one line branch or the other between the reservoir and the first cylinder space, wherein the controllable valve means comprises at least two valves in the line means, each controllable independently of one another.

8. Suspension system according to claim 7, wherein the varying means includes control means for sensing pitch and roll angles of the vehicle body by vertical positions of the front and rear wheels and the difference between the average values of vertical positions of wheels on one vehicle side and wheels on another vehicle side.

9. Suspension system for vehicles having individual shock absorbers between each vehicle wheel and a vehicle body and with supporting forces for influencing the vehicle body position which are independently variable from wheel to wheel, comprising varying means for varying the supporting forces at each shock absorber of the vehicle wheels by controlling a difference between damping coefficients in a tension and a compression operation, wherein the individual shock absorbers are double-acting hydraulic telescopic shock absorbers comprising:

a cylinder;

a piston guided displaceably in the cylinder and dividing the cylinder into first and second spaces at respective opposite sides of the piston;

the piston having a piston rod located on one side thereof and extending through the first cylinder space;

line means connecting the first cylinder space to the second cylinder space;

a first non-return valve arrangement in said line which only allows flow from the second cylinder space into the first cylinder space;

a hydraulic reservoir connected to said first cylinder space via a controllable valve means and to the second cylinder space via a further non-return valve means which allows only for flow from the reservoir into the second cylinder space, wherein the line means comprises two parallel line branches with a two position change-over valve means which connects either one line branch or the other between the reservoir and the first cylinder space, wherein the controllable valve means comprises at least two valves that are coupled to one another in driving terms, in such a way that the flow resistance of one of the at least two valves increases when the flow resistance of another of the two valves is reduced.

10. Suspension system according to claim 9, wherein the varying means includes control means for sensing pitch and roll angles of the vehicle body by vertical positions of the front and rear wheels and the difference between the average values of vertical positions of wheels on one vehicle side and wheels on another vehicle side.

* * * * *